(12) United States Patent
Kasarla

(10) Patent No.: US 11,997,371 B2
(45) Date of Patent: May 28, 2024

(54) VEHICULAR COOLING SYSTEM FOR FORWARD CAMERA MODULE

(71) Applicant: Magna Electronics Inc., Auburn Hills, MI (US)

(72) Inventor: Nagender Reddy Kasarla, New Hudson, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 341 days.

(21) Appl. No.: 17/648,238

(22) Filed: Jan. 18, 2022

(65) Prior Publication Data

US 2022/0239817 A1 Jul. 28, 2022

Related U.S. Application Data

(60) Provisional application No. 63/199,854, filed on Jan. 29, 2021, provisional application No. 63/199,812, filed on Jan. 27, 2021, provisional application No. 63/199,748, filed on Jan. 22, 2021.

(51) Int. Cl.
| | |
|---|---|
| *H04N 23/52* | (2023.01) |
| *H04N 7/18* | (2006.01) |
| *H04N 23/57* | (2023.01) |
| *B60S 1/02* | (2006.01) |

(52) U.S. Cl.
CPC ............... *H04N 23/52* (2023.01); *H04N 7/18* (2013.01); *H04N 23/57* (2023.01); *B60S 1/026* (2013.01)

(58) Field of Classification Search
CPC .......... H04N 23/52; H04N 23/57; H04N 7/18; B60S 1/026

USPC ........................................................ 348/143
See application file for complete search history.

(56) References Cited

U.S. PATENT DOCUMENTS

| | | | |
|---|---|---|---|
| 6,690,268 B2 | 2/2004 | Schofield et al. | |
| 6,824,281 B2 | 11/2004 | Schofield et al. | |
| 7,038,577 B2 | 5/2006 | Pawlicki et al. | |
| 7,480,149 B2 | 1/2009 | DeWard et al. | |
| 7,720,580 B2 | 5/2010 | Higgins-Luthman | |
| 7,855,755 B2 | 12/2010 | Weller et al. | |
| 8,256,821 B2 | 9/2012 | Lawlor et al. | |
| 9,487,159 B2 | 11/2016 | Achenbach | |
| 9,596,387 B2 | 3/2017 | Achenbach et al. | |
| 9,871,971 B2 | 1/2018 | Wang et al. | |
| 9,896,039 B2 | 2/2018 | Achenbach et al. | |
| 10,104,808 B2 | 10/2018 | Scharinger et al. | |
| 11,019,324 B2 * | 5/2021 | Ishii | H04N 23/52 |

(Continued)

*Primary Examiner* — Matthew David Kim
(74) *Attorney, Agent, or Firm* — HONIGMAN LLP

(57) ABSTRACT

A vehicular vision system includes a camera module mounted at an in-cabin side of a windshield of a vehicle. The camera module includes a windshield-interfacing portion that, with the camera module mounted at the in-cabin side of the windshield, interfaces with the in-cabin side of the windshield. A thermally conductive tape is disposed at the windshield-interfacing portion. A thermally conductive connecting element thermally conductively connects to (i) the thermally conductive tape and (ii) at least one component of the camera module. When electrically operated, the at least one component generates heat at an interior portion of the camera module and heat generated by the at least one component of the camera module is dissipated at the windshield of the vehicle via the thermally conductive connecting element and the thermally conductive tape.

25 Claims, 8 Drawing Sheets

(56) References Cited

U.S. PATENT DOCUMENTS

| | | |
|---|---|---|
| 11,290,622 B2 | 3/2022 | Solar |
| 2002/0126453 A1 | 9/2002 | Ubukata |
| 2008/0016945 A1* | 1/2008 | Rothacher .......... B60H 1/00785 |
| | | 73/29.05 |
| 2009/0295181 A1 | 12/2009 | Lawlor et al. |
| 2012/0014064 A1 | 1/2012 | St. Rock et al. |
| 2014/0055667 A1 | 2/2014 | Kawamura |
| 2014/0160284 A1 | 6/2014 | Achenbach et al. |
| 2014/0226012 A1 | 8/2014 | Achenbach |
| 2015/0015713 A1 | 1/2015 | Wang et al. |
| 2015/0327398 A1* | 11/2015 | Achenbach ............. B60R 11/04 |
| | | 348/148 |
| 2016/0119509 A1* | 4/2016 | Wato ...................... G03B 17/55 |
| | | 348/148 |
| 2016/0227079 A1 | 8/2016 | Oh |
| 2016/0307953 A1* | 10/2016 | Kono ..................... B60R 11/04 |
| 2017/0064877 A1* | 3/2017 | Ratcliffe ............ H05K 7/20872 |
| 2017/0070652 A1* | 3/2017 | Müller .................. G03B 17/55 |
| 2017/0129404 A1 | 5/2017 | Oda |
| 2017/0131621 A1 | 5/2017 | Tang et al. |
| 2017/0182944 A1 | 6/2017 | Achenbach et al. |
| 2017/0184945 A1* | 6/2017 | Carlson ................. G03B 17/02 |
| 2019/0124238 A1* | 4/2019 | Byrne .................... H04N 23/52 |
| 2019/0124243 A1* | 4/2019 | Mleczko ................ B60R 11/04 |
| 2019/0128589 A1 | 5/2019 | Adams et al. |
| 2019/0306966 A1 | 10/2019 | Byrne et al. |
| 2020/0039447 A1 | 2/2020 | Winden |
| 2020/0148137 A1 | 5/2020 | Cordeiro |
| 2020/0154020 A1 | 5/2020 | Byrne et al. |
| 2021/0306538 A1 | 9/2021 | Solar |
| 2021/0368082 A1 | 11/2021 | Solar |

* cited by examiner

Camera mounting Bracket to windshield thermal conductive sheet/ tape is directly connected to heat source and windshield

VEHICULAR COOLING SYSTEM FOR FORWARD CAMERA MODULE

CROSS REFERENCE TO RELATED APPLICATIONS

The present application claims the filing benefits of U.S. provisional application Ser. No. 63/199,854, filed Jan. 29, 2021, U.S. provisional application Ser. No. 63/199,812, filed Jan. 27, 2021, and U.S. provisional application Ser. No. 63/199,748, filed Jan. 22, 2021, which are hereby incorporated herein by reference in their entireties.

FIELD OF THE INVENTION

The present invention relates generally to a vehicle vision system for a vehicle and, more particularly, to a vehicle vision system that utilizes a windshield mounted forward viewing camera at a vehicle.

BACKGROUND OF THE INVENTION

Use of imaging sensors in vehicle imaging systems is common and known. Examples of such known systems are described in U.S. Pat. Nos. 9,896,039; 9,871,971; 9,596,387 and/or 9,487,159, which are hereby incorporated herein by reference in their entireties. Heat is generated during operation of the cameras, and heat dissipating fins or the like are typically used to dissipate heat.

SUMMARY OF THE INVENTION

A driver assistance system or vision system or imaging system for a vehicle utilizes a windshield mounted forward viewing camera module having a camera that captures image data representative of images of scenes exterior of the vehicle, and provides a cooling system that is integrated in the camera module to conduct heat from one or more heat generating components of the camera module to the windshield of the vehicle to enhance cooling of the camera module during operation of the camera. The cooling system comprises a thermally conductive tape that extends around a peripheral lip of a mounting portion or surface of the camera module, such as a peripheral lip of a light shield of the camera module, and that interfaces with or engages or adheres to or thermally conductively connects to the in-cabin side of the vehicle windshield and that extends to or into the camera module housing to interface with or engage or adhere to or thermally conductively connect to the heat generating component of the camera module.

Optionally, the system provides a cooling system that controls a blower of a heating, ventilation and air conditioning (HVAC) system of the vehicle to force cooling air over one or more parts of the camera module to enhance cooling of the camera module during operation of the camera.

Optionally, the system includes an electronic control unit (ECU) including a housing that encapsulates a circuit board when the circuit board is disposed at an interior surface of the housing. The circuit board includes at least one electronic component. Heat dissipating fins are disposed at least at an outer side of the housing and are in thermal connection with the circuit board within the housing via a thermal interface material disposed at the circuit board. An airflow source provides an airflow which draws air and directs airflow along and between the heat dissipating fins of the outer side of the housing. Optionally, the airflow source comprises a cooling fan assembly attached at the outer side of the housing. In those implementations, the cooling fan includes an electrically powerable motor that, when electrically powered, rotatably drives a plurality of fan blades of the cooling fan assembly to force air along or across the outer side of the housing, such as along and between the heat dissipating fins at the outer side of the housing.

These and other objects, advantages, purposes and features of the present invention will become apparent upon review of the following specification in conjunction with the drawings.

DESCRIPTION OF THE PREFERRED EMBODIMENTS

A vehicular vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
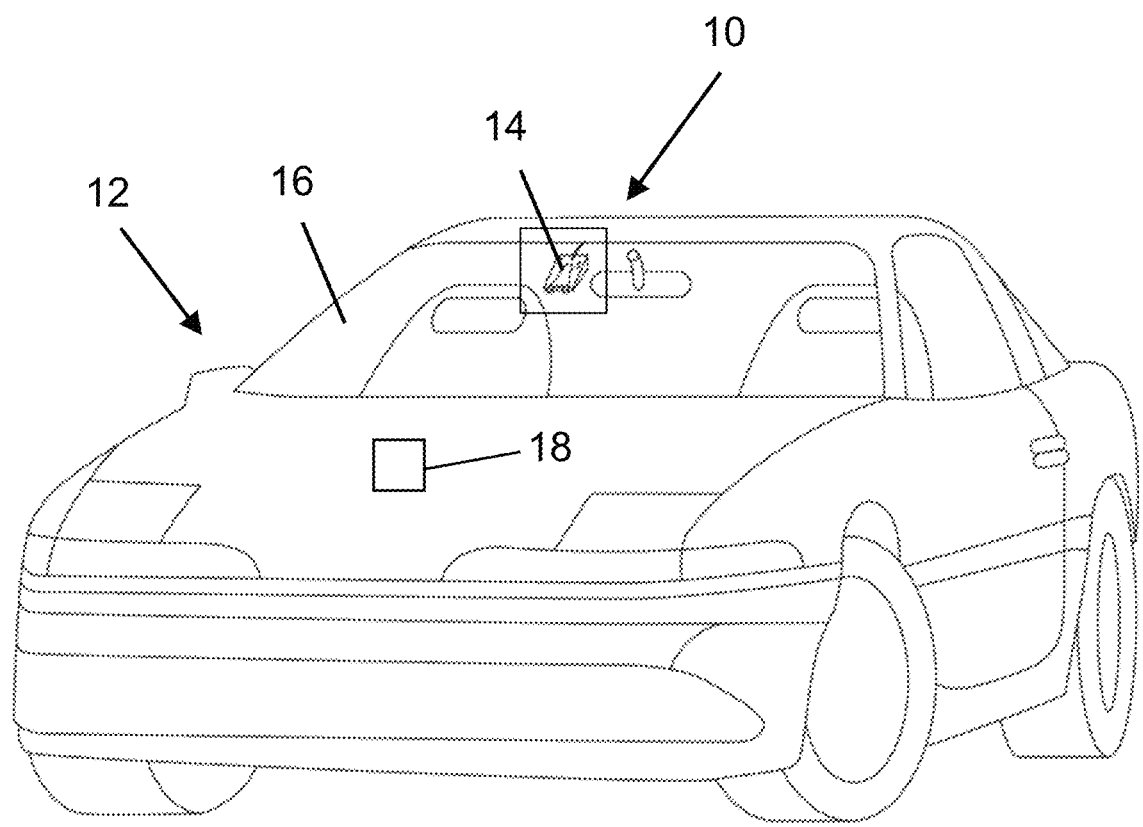
FIG. 1 is a perspective view of a vehicle with a vision system that incorporates a windshield mounted forward viewing camera module.

Referring now to the drawings and the illustrative embodiments depicted therein, a vision system 10 for a vehicle 12 includes at least one exterior viewing imaging sensor or camera or camera module 14, such as a forward viewing imaging sensor or camera, which may be disposed at and behind the windshield 16 of the vehicle 12 and viewing forward through the windshield 16 so as to capture image data representative of the scene occurring forward of the vehicle (FIG. 1). Optionally, the system 10 may include multiple exterior viewing imaging sensors or cameras, such as a forward viewing camera at the front of the vehicle 12, and a sideward/rearward viewing camera at respective sides of the vehicle 12, and a rearward viewing camera at the rear of the vehicle 12, which capture images exterior of the vehicle 12. The camera or cameras each include a lens for focusing images at or onto an imaging array or imaging plane or imager of the camera. Optionally, the forward viewing camera 14 may be disposed at the windshield 16 of the vehicle 12 and view through the windshield 16 and forward of the vehicle 12, such as for a machine vision system (such as for traffic sign recognition, headlamp control, pedestrian detection, collision avoidance, lane marker detection and/or the like). The vision system 10 includes a control or electronic control unit (ECU) 18 that may control a heating, ventilation and air conditioning (HVAC) system of the vehicle, as discussed below.

The ECU 18 includes electronic circuitry and associated software, and the electronic circuitry may include an image and/or data processor that is operable to, for example, process image data captured by the camera or cameras and may detect objects or the like and/or provide displayed images at a display device for viewing by the driver of the vehicle 12. The data transfer or signal communication from the camera 14 to the ECU 18 may comprise any suitable data or communication link, such as a vehicle network bus or the like of the equipped vehicle 12. The ECU may be disposed at a location remote from the camera module or may be incorporated into the camera module.

Heat is generated during operation of the camera 14, such that, without enhanced cooling, maximum operating temperatures at the camera 14 and/or associated electronics may be exceeded. For instance, the imager semiconductor junction temperature may be required to be below a threshold temperature to ensure necessary image quality. The camera module 14 and/or windshield electronics module in which the camera module is disposed may utilize aspects of the cameras and modules and systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2021-0368082; US-2021-0306538 and/or US-2020-0039447, which are hereby incorporated herein by reference in their entireties.

Figure 2:
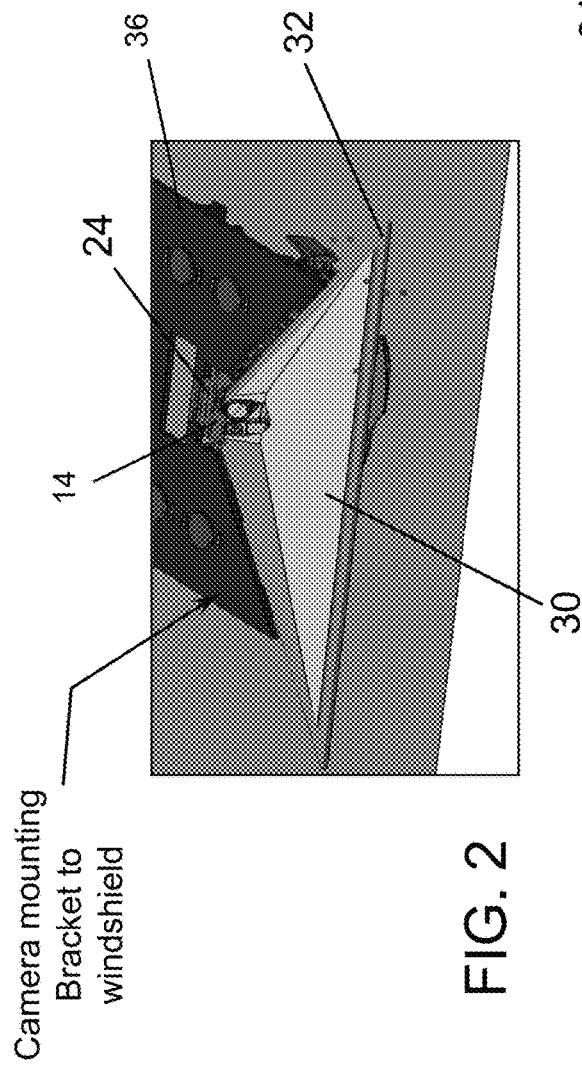
FIG. 2 is a perspective view of the camera module, with a light shield having a thermally conductive tape disposed thereat.
Figure 4A:
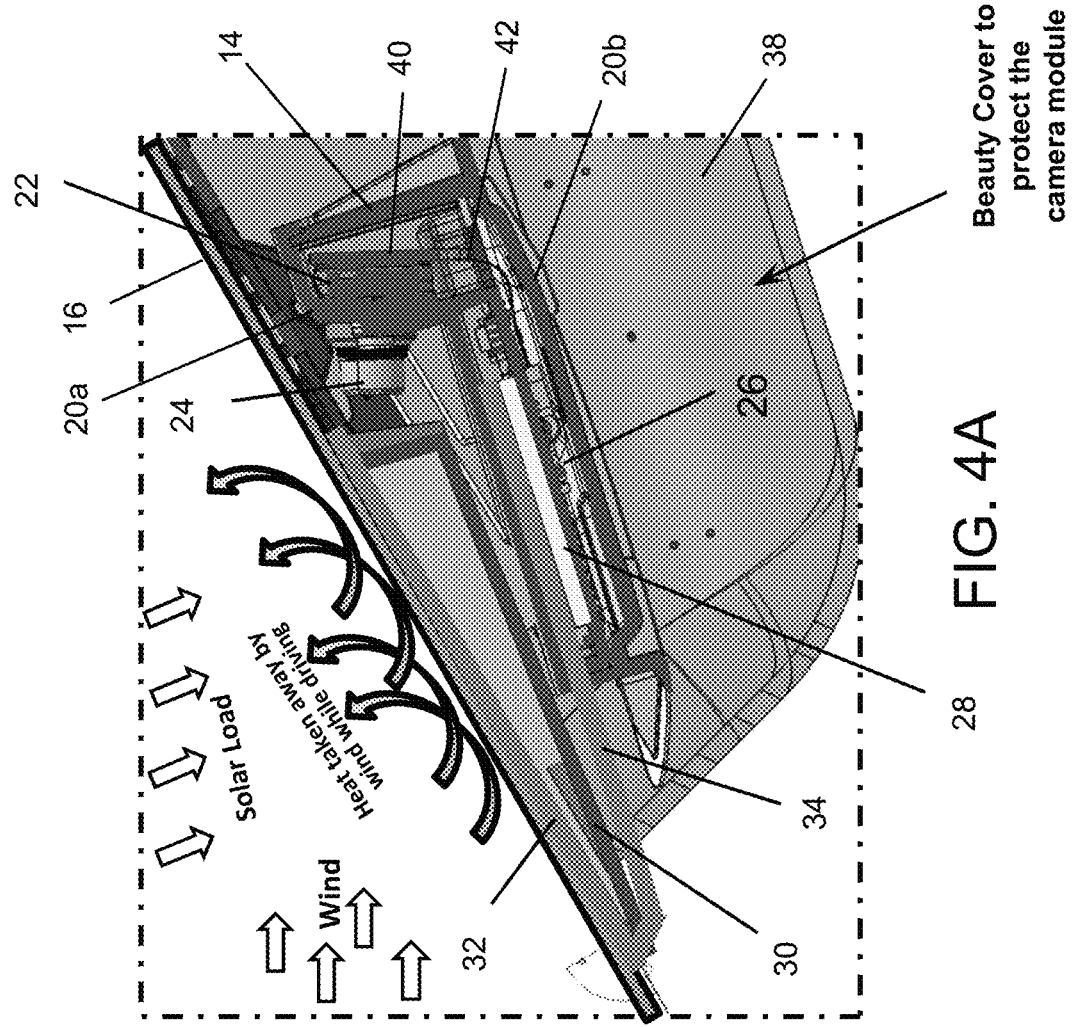
FIG. 4A is a sectional view of the camera module and light shield of FIG. 4, taken along the line A-A in FIG. 4.
Figure 4:
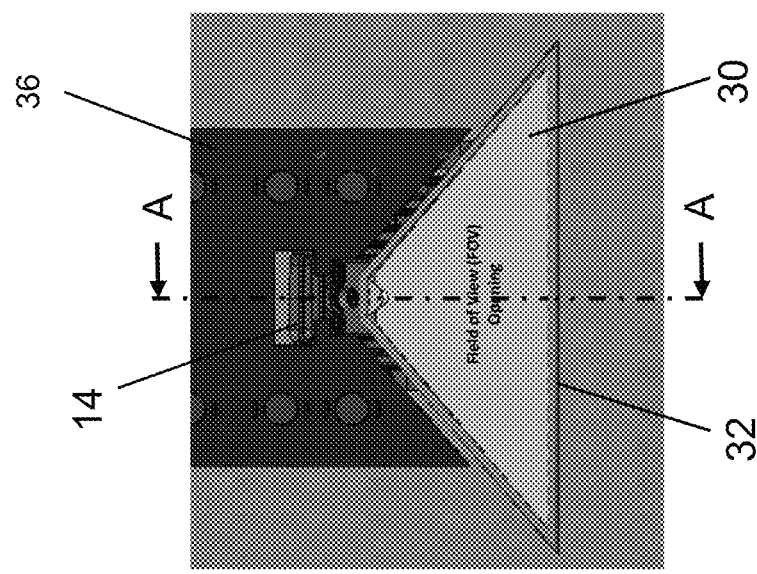
FIG. 4 is a top plan view of the camera module and light shield having the thermally conductive tape disposed thereat.

In the illustrated embodiment, the camera module 14 includes a housing 20 (e.g., a metal or metallic housing) comprising an upper housing portion 20*a* (e.g., a metal or metallic upper housing portion) and the lower housing portion 20*b* (e.g., a metal or metallic lower housing portion), with a camera or imager assembly 22 partially disposed in the housing 20. The camera 22 comprises an imager circuit board having an imager thereat, and further comprises a lens barrel 24 (accommodating a lens or lens assembly having optic lens elements optically aligned with the imager of the imager circuit board) that protrudes through an aperture of the upper housing portion 20*a* (as shown in FIGS. 2 and 4A). The camera module 14 includes a main or principle or primary or processor circuit board 26 disposed in the housing 20, with the primary circuit board 26 comprising a heat generating component 28, such as an integrated circuit (IC) or image processor that processes image data captured by the camera. The imager circuit board 40 may be electrically connected to the main circuit board 26 via a flexible connector 42, such as a flexible ribbon cable or the like, whereby image data captured by the camera is provided to the primary or main circuit board 26 via the flexible connector 42.

Because of the amount of heat typically generated by the circuitry of the circuit boards during operation of the camera module (and particularly the heat generated by the image processor of the primary circuit board 26 during operation of the camera module 14), the camera housing 20 may include heat dissipating fins that are present at an outer-side location at the outer side of the upper housing portion 20*a* and may also or otherwise be present at an outer-side location of the lower housing portion 20*b*, such as at a location that coincides with or is juxtaposed with an inner-side location of a thermal element (such as a thermally conductive paste or grease or the like) that thermally conductively connects the image processor with the inner side of the housing portion. Thus, the image processor is in thermally conductive connection with the housing 20, such as at an inner location of the housing opposite where the heat dissipating fins are located, via the thermal element and a wall thickness (of the lower wall or structure) of the lower housing portion 20*b* at the location where the thermal element is disposed.

The camera module 14 may be mounted or attached at a bracket 36 that is adhesively attached at the in-cabin side of the vehicle windshield 16, and a cover element 38 (such as for the windshield electronics module) may also be attached at the bracket 36 or attached at a frame or other bracket that is adhesively attached at the in-cabin side of the vehicle windshield 16. The cover element 38, camera module 14 and bracket 36 or brackets comprise a windshield electronics module that houses the camera module 14 and that may also house one or more other electronic accessories (e.g., a rain sensor and/or the like) at the in-cabin side of the vehicle windshield 16. Thus, the camera module 14 comprises a forward viewing camera module or front camera module (FCM), such as disposed at the windshield 16, and optionally at a windshield electronics module (WEM) or the like. The forward viewing camera module may utilize aspects of the systems described in U.S. Pat. Nos. 9,896,039; 9,871, 971; 9,596,387; 9,487,159; 8,256,821; 7,480,149; 6,824,281 and/or 6,690,268, which are all hereby incorporated herein by reference in their entireties.

As shown in FIG. 2, the camera module 14 is mounted at the interior portion of the vehicle, such as at the in-cabin side of the windshield 16 or a headliner of the vehicle adjacent or near the upper perimeter edge region of the windshield 16. Thus, the camera module includes a mounting surface or interface at an interior surface or in-cabin side of the windshield of the vehicle. The mounting surface may comprise, for example, a portion of the housing 20 or a portion of the bracket 36. The camera module 14 is at least partially mounted at or attached to or interfacing with the in-cabin side of the windshield 16 via thermally conductive adhesive tape 32 disposed at or adhered to the mounting surface and that is in thermal connectivity with the camera module 14 and with the windshield 16. For example, the camera module 14 includes a light trap or light shield 30 that blocks or redirects or attenuates glare light in front of the lens of the camera 22. The light trap 30 may be attached to the camera module 14 or attached to the bracket 36 at the windshield 16 or may be adhesively attached at the in-cabin side of the windshield 16. The light trap 30 includes the thermally conductive adhesive tape 32 disposed about its perimeter at an interface surface that is pressed into engagement with the in-cabin side of the windshield 16 when the camera module 14 is disposed at the in-cabin side of the windshield 16. The thermally conductive tape 32 may comprise, for example, a double-sided adhesive tape, such as a graphite strip or sheet or graphene material that adheres to the light trap 30 and to the windshield 16.

Figure 3:
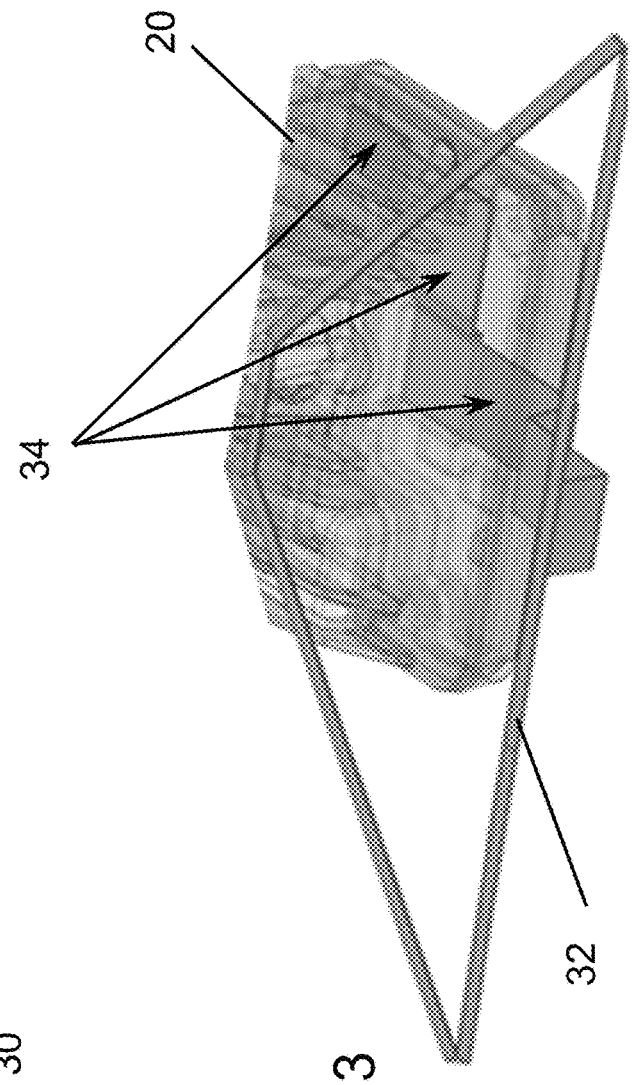
FIG. 3 is another perspective view of the camera module, showing the thermally conductive tape and a thermally conductive connecting tape that connects to one or more heat generating components within the camera module.

As shown in FIGS. 3 and 4A, the thermally conductive tape 32 may be connected directly to the one or more heat generating components 28 of the camera 22 (such as to processors or integrated circuits (ICs) disposed on the printed circuit board of the camera) via a thermally conductive connecting tape or ribbon 34 that is routed from a connecting region of the thermally conductive tape 32 at the light trap 30 to the camera housing 20 and optionally into the camera housing 20 to thermally conductively connect to the heat generating component or components 28 within the camera housing 20. For example, the connecting tape 34 may thermally conductively connect to the main circuit board 26 and to the imager circuit board 40 of the camera 22. The connecting tape 34 may connect to an outer surface of the camera housing 20 at a location that corresponds to where a thermally conductive paste or element is disposed at an inner surface of the camera housing 20, where the thermally conductive paste or element may be in thermally conductive contact with a heat generating component 28 (e.g., an image processor or the like) within the camera housing 20. Optionally, the connecting tape 34 may pass through the housing wall (such as at an interface where the upper and lower housing portions are mated together) and into the housing cavity for more direct thermally conductive connection to the heat generating component 28.

The thermally conductive connecting tape 34 may thermally conductively connect to multiple heat generating components 28, such as via connecting or adhering to multiple locations along the outer surface of the camera housing 20 (with each location coinciding with a location of a heat generating component 28 within the camera housing 20) or such as adhering along a larger region of the camera housing 20 (that spans or encompasses areas that coincide with separate heat generating components). Optionally, the camera housing end of the thermally conductive connecting tape 34 may comprise a sheet that encompasses or covers a larger area of the camera housing 20 (and that may be formed to cover heat dissipating fins of the camera housing) to enhance conduction of heat from the camera housing 20 to the windshield 16. In other words, the thermally conductive connecting tape 34 may have a connecting portion at the camera housing 20 or at the heat generating component 28 with a first width dimension, and the connecting tape may have a second width dimension along a portion of the connecting tape 34 routing from the adhesive tape 32 at the light trap 30 to the connecting portion that is less than the first width. Thus, the thermally conductive connecting tape 34 may cover a greater area of the camera housing 20 at portions of the camera housing corresponding to heat generating components 28. Optionally, the larger sheet portion of the thermally conductive connecting tape may be disposed at and over the inner surface of the camera module, whereby one or more thermally conductive elements (e.g., thermally conductive paste or grease or tape) may be disposed between and in contact with the sheet portion and the respective heat generating component(s). Optionally, the thermally conductive connecting tape 34 may be positioned at the windshield electronics module to dissipate heat from the camera 22 and from additional heat generating electronic components at the windshield electronics module, such as printed circuit boards or processors or sensors (e.g., rain or glare light sensors).

In the illustrated embodiment, the thermally conductive connecting tape 34 routing from the windshield 16 to the one or more heat generating components 28 comprises a single flat ribbon bent or shaped to discretely contact a plurality of individual heat generating components, each at a position along the flat ribbon. Optionally, the thermally conductive connecting tape 34 may comprise a plurality of individual ribbons or tapes, each individual ribbon routing from the adhesive tape 32 at the light trap 30 to a corresponding heat generating component 28. Optionally, the thermally conductive connecting tape 34 may attach at or near a common or central or universal heat sink of the windshield electronics module dissipating heat from a plurality of heat generating components to draw heat away from the windshield electronics module at a universal or central position.

As shown, the thermally conductive connecting tape 34 routes from the heat generating component 28 of the camera module 14 to a thermally conductive adhesive tape 32 surrounding the light trap 30 and at least partially securing the light trap 30 at the windshield 16. The thermally conductive tapes 32, 34 dissipate heat away from the camera module 14. For example, the camera module may be mounted directly at the in-cabin side of the windshield 16 and the thermally conductive connecting tape 34 may route to thermally conductive adhesive tape 32 affixing the camera module 14 to the windshield (i.e., at a location that is not a light trap). Optionally, the thermally conductive adhesive tape 32 may attach at the in-cabin side of the windshield 16 remote from the camera module 14, such as along an upper perimeter edge region of the windshield 16 (e.g., at a location corresponding to a tinted or at least partially opaque strip along the upper perimeter edge).

Dissipating heat to the windshield 16 of the vehicle via the thermally conductive connecting tape 34 and thermally conductive adhesive tape 32 provides a heat dissipating solution that is enhanced during operation of the vehicle. As the vehicle travels, airflow at the windshield 16 cools the windshield 16 and thus allows for continuous heat dissipation at the windshield 16. Additionally, heat generated by the camera module and dissipated to the windshield 16 may reduce or eliminate ice, frost, and condensation at the windshield and particularly at the portion of the windshield through which the forward viewing camera 22 views. Thus, heat dissipation at the windshield 16 may reduce or eliminate the need for heating elements at the windshield 16. Heat dissipated at the camera module may be further routed along the windshield (such as at the perimeter region of the windshield) to provide additional heat dissipation to the camera module 14 and additional frost, ice and condensation reduction at the windshield 16.

Thus, the camera module uses a thermally conductive sheet/tape (e.g., a graphite sheet) that conducts or dissipates heat out from the camera module. The thermally conductive sheet may be directly connected to heat sources, such as processors, chips, ICs or the like, and to the in-cabin side of the windshield, which helps to dissipate heat generated by the heat source instantaneously and continuously rather than relying on fans or HVAC or other means of heat dissipation. The camera module thus conducts heat out of the system via the windshield to the outside ambient environment. During driving conditions additional wind and air flow at the outer side of the windshield will help cool the windshield to conduct heat out of the camera module at a faster rate. During frost conditions, the heat generated by the camera module can be used to help quickly melt ice at the windshield in front of the camera to keep the field of view of the camera clear of any ice/frost, which could otherwise impact camera availability. The camera module may eliminate use of fans to cool the module, and may eliminate use of separate heater elements to heat the windshield during frost conditions, which will eventually help reduce costs. Optionally, the camera module and/or windshield electronics module may also include a cooling fan to further enhance cooling of the camera module during operation.

The thermally conductive tape and/or the thermally conductive connecting element may comprise a two-sided adhesive tape comprising thermally conductive material, such as graphite or graphene material. For example, the thermally conductive tape and/or the thermally conductive connecting element may have a high coefficient for thermal conduction (i.e., a material that conducts a greater quantity of heat per unit time through a unit cube of the material when its opposite faces are kept at a temperature difference of one degree), such as, for example, greater than 80 W/m·K, or greater than 100 W/m·K, or greater than 150 W/m·K), and may comprise a combination of fiberglass that fills conductive ceramic powder for higher efficiency and flexibility of thermal conduction, or may comprise a silicone and filler combination that is also compressible to compress and seal between the windshield and the windshield interfacing portion of the camera module.

Optionally, the camera module may be mounted at any suitable surface of the vehicle and dissipate heat via the thermally conductive tape to the mounting surface. For example, the camera module may be a rearward viewing camera (such as a rearward viewing CHMSL-mounted camera) mounted at the rear of the vehicle and viewing through the rear window. Thus, the thermally conductive adhesive tape may, with the camera mounted at the rear window, attach at the rear window and, via the thermally conductive connecting tape, dissipate heat from the rear camera to the rear window. Optionally, the camera module may be a driver or occupant monitoring camera mounted at the interior cabin of the vehicle and viewing the interior cabin of the vehicle (such as a head region of the driver of the vehicle), the heat from the camera dissipated to the mounting surface, such as the windshield or headliner of the vehicle.

Thus, the system provides a camera module including a housing and a heat generating component, such as an image processor. The camera module mounts at an in-cabin surface of the vehicle, such as at the in-cabin side of the windshield, and may view through the windshield of the vehicle. The camera module may at least partially attach at the in-cabin surface of the vehicle via thermally conductive adhesive tape and the thermally conductive adhesive tape is in thermal connectivity with thermally conductive connecting tape. The thermally conductive connecting tape is in thermal connectivity with the heat generating component of the camera module and dissipates heat from the camera module to the mounting surface via the thermally conductive adhesive tape. Thus, the system may provide improved heat dissipation from the camera module and a defrosting or defogging feature at the mounting surface.

Figure 5:
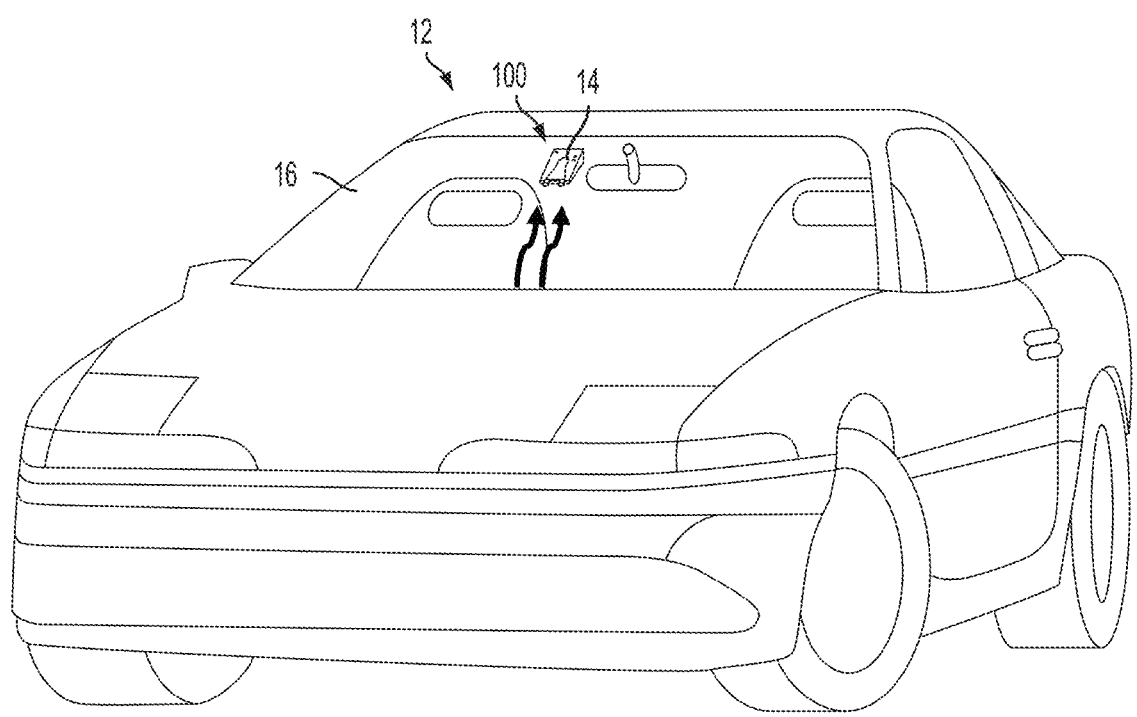
FIG. 5 is a perspective view of a vehicle, showing airflow directed from an HVAC system of the vehicle directed toward the camera module.

Optionally, and as described below, the system may direct airflow towards or over or on to the ECU or camera module or electronics module to cool the ECU or camera module or windshield electronics module. For example, as shown in FIG. 5, a system 100 controls a blower motor of a heating, ventilation and air conditioning (HVAC) system of the vehicle 12 to force cooling air over one or more parts of the camera module to enhance cooling of the camera module during operation of the camera. The controller 18 controls the HVAC blower motor (and optionally sets the HVAC to a windshield defogging mode) that operates to force air over and around the camera module's body or housing to enhance cooling of the camera during operation. The system 100 may operate in conjunction with the system 10 described above (such that the system 100 may comprise a portion of the system 10) or the system 100 may operate as a standalone driver assistance system or vision system or imaging system for the vehicle 12.

Vision systems features and functions are increasing significantly to provide additional functionality to consumers and also to meet international standards and regulations. More features and function means high processing speed and more power consumption. The higher the power consumption, the higher the heat generation from the system. To help the system work more efficiently, without degrading performance and durability, heat transfer should be well designed to take away heat from the system by conduction, convection and/or radiation.

The system 100 utilizes forced air convection (as provided by the HVAC system of the vehicle) to remove heat from the camera module 14. The camera module 14 (or windshield electronics module) includes a thermal sensor or temperature sensor 44 that senses the temperature at or in the camera module 14. An output of the temperature sensor 44 is received at the ECU 18. When the thermal sensor 44 detects a high temperature in the camera 14 (greater than a threshold temperature), the ECU 18, responsive to the signal or output received at the central ECU 18 from the temperature sensor 44, communicates a control signal to an HVAC ECU 48 triggering the HVAC ECU 48 to activate a windshield blowing function (optionally including turning on the air conditioning (A/C) 50 of the vehicle 12) and to open vent flaps 56 at the dashboard by the windshield to force and direct air upwards along the in-cabin side of the windshield 16 towards the camera module.

Figure 6:
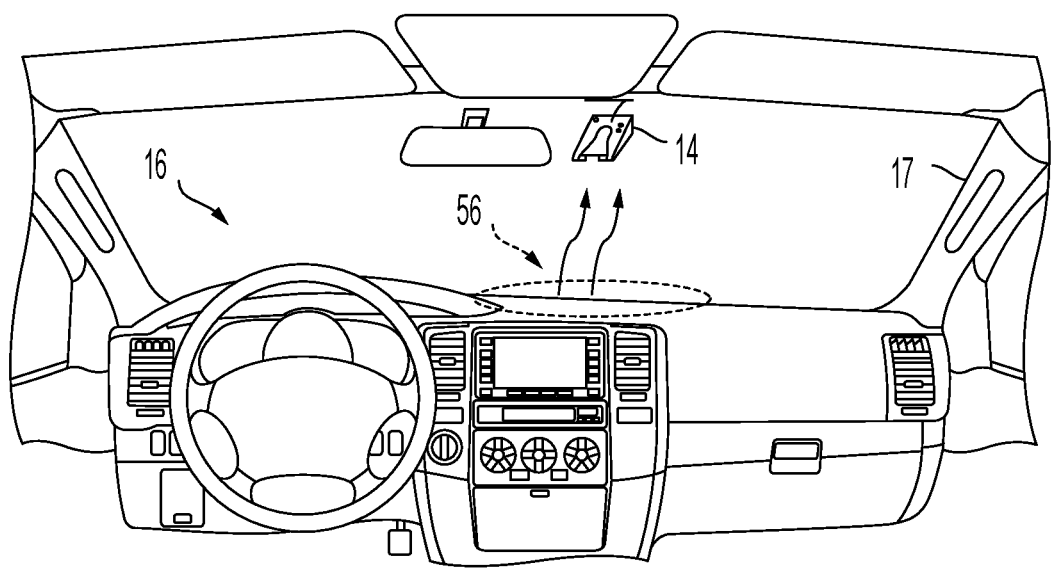
FIGS. 6 and 7 are perspective views of the interior cabin of the vehicle, showing the air flow from the vent openings to the windshield-mounted forward viewing camera module.
Figure 7:
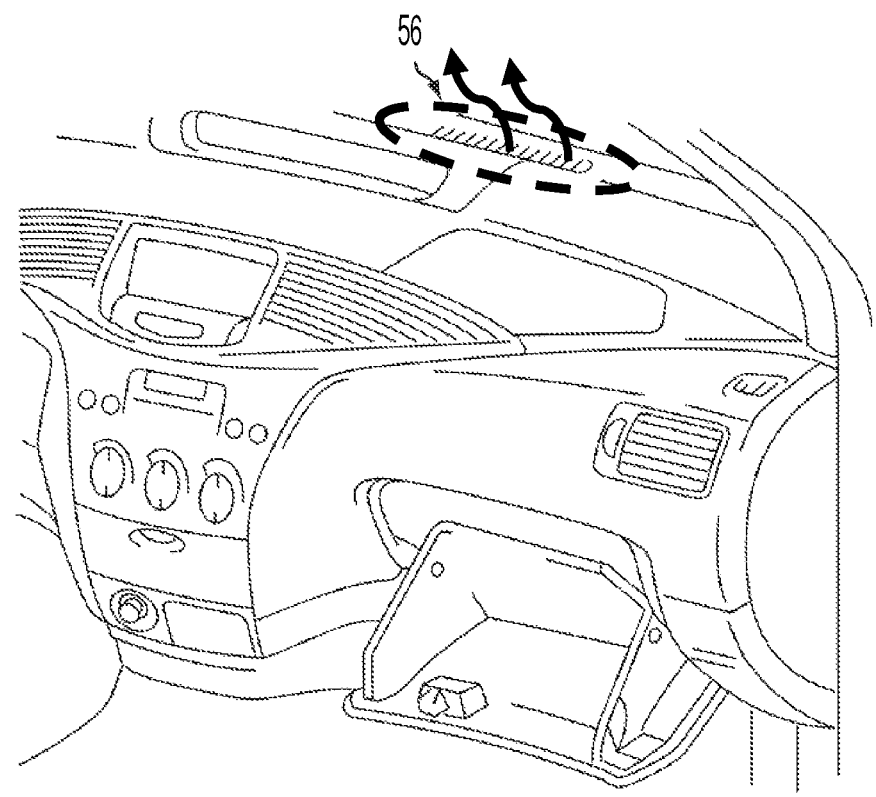

As shown in FIGS. 6 and 7, a vent opening 56 on the vehicle dashboard or instrument panel may be specifically designed or designated for blowing and directing air towards the camera module 14 (i.e., the vent opening may be separate and distinct from the vents for a windshield defogging function of the HVAC system). The vent flaps may be opened and closed by the system, such as via signal from the ECU 18, responsive to the camera temperature, and may, when the camera temperature reaches a threshold temperature, be opened to direct air towards the camera 14 and not into the entire cabin. When the camera temperature is within a normal operating temperature range, the vent 56 remains closed, irrespective of the HVAC setting selected by the occupant of the vehicle. The vent openings 56 for the front camera module 14 thus direct air towards the module when the camera module temperature goes beyond its normal operating design limits.

Figure 8:
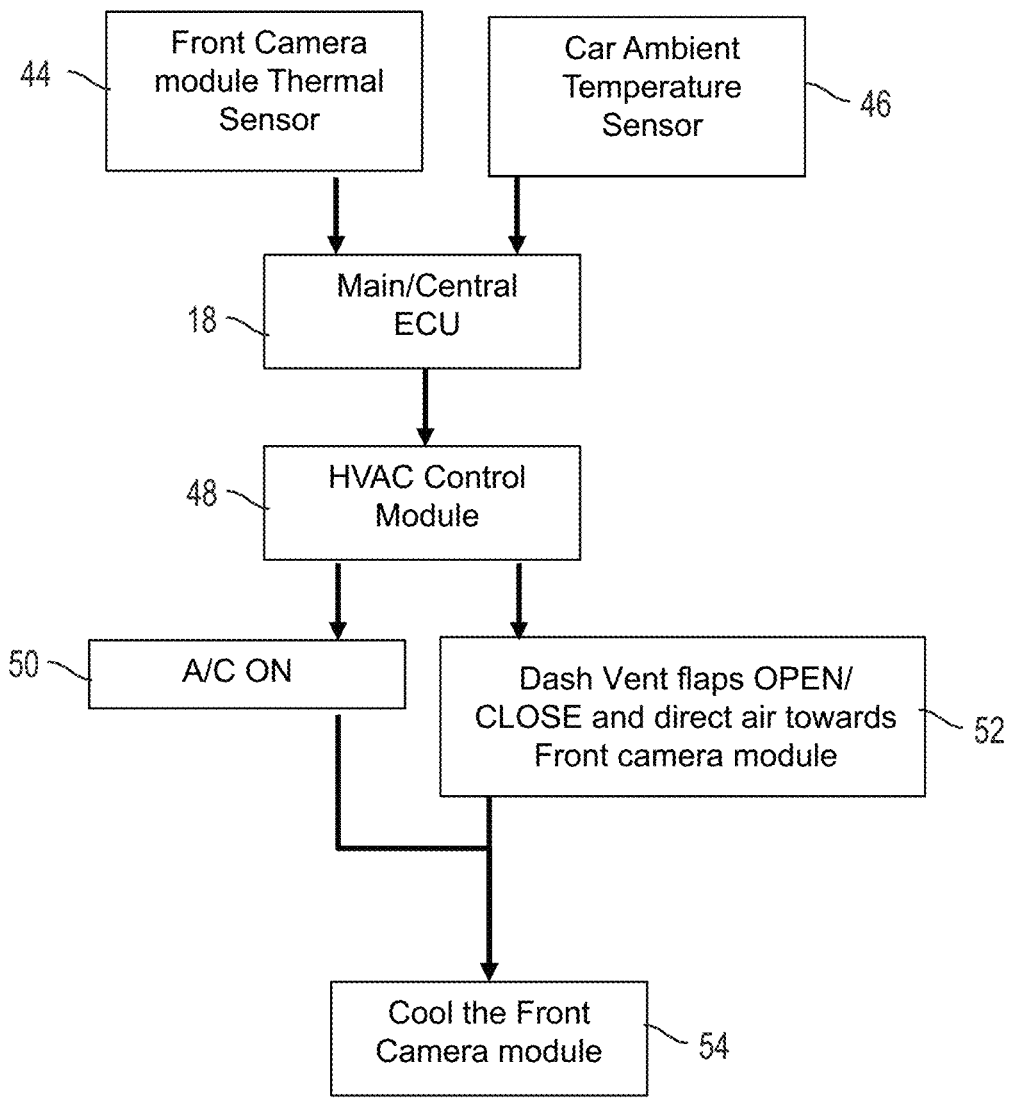
FIG. 8 is a process flow diagram of the cooling system.

Thus, and as shown in FIG. 8, the ECU 18 receives inputs from the front camera module thermal sensor 44 and a vehicle ambient temperature sensor 46. Responsive to these inputs, the ECU 18 generates a control signal to the vehicle's HVAC control module 48. When the inputs indicate that the temperature of the camera module 14 is greater than a threshold level, the ECU 18 indicates this to the HVAC control module 48 turns on the vehicle's A/C 50 and opens the dash vent flaps at the vent 56 (see 52 in FIG. 8) to cool the front camera module (see 54 in FIG. 8). The vent openings are separate from vents that operate to defrost the windshield, and open responsive to the temperature at the camera module and not responsive to a user input.

The system 100 thus may open the vent openings 56 and activate the A/C 50 and control the blower temperature to force cold air through the opened vent openings 56 responsive to the temperature of the camera 14 being greater than an upper threshold temperature (such as greater than, for example, 40 degrees C., or greater than 50 degrees C., or greater than 60 degrees C. or thereabouts). Optionally, the system 100 may also open the vent openings 56 and control the blower temperature to force warm air (by controlling the temperature of the air discharged through the vent via adjusting a temperature setting of the HVAC system) through the opened vent openings 56 responsive to the temperature of the camera 14 (when the vehicle is being operated) being less than a lower threshold temperature (such as less than, for example, 10 degrees C., or less than 0 degrees C., or less than −10 degrees C., or less than −20 degrees C. or thereabouts).

Optionally, the system 100 may control the HVAC system or control module 48 at least in part responsive to the ambient temperature at the vehicle (such as the ambient temperature within the cabin of the vehicle or exterior of the vehicle). For example, the system 100 may control the HVAC system to provide cooler (air conditioned) air in situations where the camera module temperature sensor 44 does not indicate an operating temperature greater than the upper threshold level, but the exterior ambient temperature sensor 46 indicates that the ambient temperature is high (greater than a threshold temperature, such as greater than, for example, 40 degrees C., or greater than 50 degrees C., or greater than 60 degrees C. or thereabouts), such that the system 100 starts the cooling process before (and in anticipation of) the camera operating temperature approaching, reaching and/or exceeding the upper operating temperature threshold. The system 100 may also or otherwise be operable responsive to a light sensor that senses ambient light at the windshield of the vehicle, so that the system 100 can determine when the lighting conditions are indicative of a sunny day and can start the cooling process before (and in anticipation of) the camera operating temperature approaching, reaching, and/or exceeding the upper operating temperature threshold.

Optionally, the system may determine or adjust or vary the upper and/or lower operating temperature thresholds. The system may determine the operating temperature thresholds based on a condition of the camera. For example, certain functions or operations of the camera may be more operationally intensive than other operations and those operations may generate heat at the camera faster than other operations. In response to determining that the function of the camera is rapidly generating heat (or that the camera module or processor is operating in a mode that is known to generate more heat than other operations), the system may lower the upper operating temperature threshold so as to activate the cooling system earlier. Optionally, the system may determine the operating temperature thresholds based on a condition of the vehicle. For example, the system may receive a signal indicating that the vehicle is low on fuel and, responsive to receiving the signal that the vehicle is low on fuel, the system may raise the upper operating temperature threshold so as to activate the cooling system only at higher temperatures to reduce the load on the HVAC system, thus conserving fuel.

The vent 56 may comprise a dedicated vent for directing air towards the windshield mounted camera 14. In other words, the dedicated vent may be separate and distinct from the windshield defogging vent (e.g., at different positions along the dashboard of the vehicle) and the HVAC system may be configured to independently direct air through the separate and discernible vents when providing a windshield defogging function and when directing air at the camera module 14. The vent may be disposed at any suitable position within the interior portion of the vehicle. For example, the vent may be disposed along the dashboard to direct air along the in-cabin side of the windshield 16 toward the camera module 14. Optionally, the vent may be disposed at an A-pillar 17 of the vehicle (such as at an upper portion of the A-pillar) and configured to direct air along the in-cabin side of the windshield 16 toward the camera module 14. Optionally, the vent may be disposed at a headliner of the vehicle and configured to direct air along a portion of the headliner of the vehicle toward the camera module 14.

Optionally, the system 100 may control the HVAC system of the vehicle to direct air toward the camera module 14 through the windshield defogging vent at the dashboard of the vehicle. For example, responsive to determining that the temperature at the camera module 14 is outside the operating temperature range (i.e., below the lower operating temperature threshold or above the upper operating temperature threshold), the system may direct air through the windshield defogging vent with the windshield defogging vent directing air along the in-cabin side of the windshield 16. Optionally, the windshield defogging vent may be configured to direct air at the windshield at a first angle (such as at the base of the windshield) when providing the windshield defogging feature and at a second angle (such as towards an upper region of the windshield) when directing air towards the camera module 14. Thus, the system may adjust the windshield defogging vent to direct air towards the windshield mounted camera module 14.

Optionally, the vent 56 directing air towards the camera module 14 may comprise only a portion of the windshield defogging vent. For example, the camera module 14 may be disposed at a central region of the windshield 16, the windshield defogging vents may be disposed along the dashboard across at least a portion of the width of the windshield and the vent 56 may comprise a portion of the windshield defogging vents corresponding to the central position of the camera module 14 at the windshield 16. Thus, the system 100 may direct air from the windshield defogging vents across the width of the windshield 16 when defogging the windshield 16 and the system may only direct air from the portion of the windshield defogging vents corresponding to the position of the camera module 14 when providing a temperature control function of the camera module 14. For example, the windshield defogging vents may have flaps or other closures at positions across the width of the windshield that are separately openable and closeable for controlling the direction of air out of the vents. Optionally, when providing a windshield defogging feature, the HVAC system may reduce or redirect the hot air directed at the windshield at the position corresponding to the camera module 14 to prevent overheating of the camera module during the windshield defogging.

Because of the amount of heat typically generated by the circuitry of the camera's circuit boards during operation of the camera 14 (and particularly the heat generated by the image processor of the primary circuit board during operation of the camera), when the electrically powered motor of the cooling system is electrically powered, the fan or blower and vent 56 direct airflow onto and along the windshield 16 and toward and to and over heat dissipating fins of the camera housing, such as at an exterior side of the lower housing portion. The heat dissipating fins of the camera 14 are at least in part present at an outer-side location at the outer side of the lower housing portion of the camera 14 that coincides with or is juxtaposed with the inner-side location of a thermal element (such as a thermally conductive paste or grease or the like) that thermally conductively connects the image processor with the inner side of the lower housing portion. Thus, the image processor is in thermally conductive connection with the heat dissipating fins via the thermal element and a wall thickness (of the lower wall or structure) of the lower housing portion at the location where the thermal element is disposed.

The camera module 14 is disposed at and behind the windshield 16 of a vehicle 12 so as to view through the windshield 16 and forward of the vehicle 12. The camera module 14 may be disposed in a housing or windshield electronics module having a cover element or beauty cover that houses the camera module (and optionally other accessories) and conceals the camera module from view by a person within the vehicle. The cover of the windshield electronics module has an interior cavity (in which the camera module is disposed), where the air may be heated during operation of the camera and/or due to higher environment temperatures. The module comprises an air entry duct that at a lower end to receive forced air from the blower fan and vent 56 at the dashboard and an exit air duct (such as at an upper end) to allow for venting of the air and to enhance air flow through the module to enhance cooling of the camera module.

Optionally, the lower housing portion or cover may be constructed with diverting fins or structure that diverts a desired amount or portion of the output air flow into and along and between the respective heat dissipating fins. For example, the diverting construction may be centrally located at a housing or cover of the windshield electronics module (that may house or cover the forward camera module 14) to divert parts of the output air flow to different sets of heat dissipating fins at the camera housing, or the diverting construction may be more towards some of the heat dissipating fins so as to divert more of the output air flow into and along, for example, lower heat dissipating fins, so as to provide enhanced cooling of heat generated by the imager processor during operation of the camera module. The housing or cover may include vent openings to optimize airflow from the HVAC blower or fan as well as to support natural convection around the camera module.

The camera module 14 may be mounted or attached at a bracket that is adhesively attached at the in-cabin side of the vehicle windshield 16, and the cover element may also be attached at the bracket or attached at a frame or other bracket that is adhesively attached at the in-cabin side of the vehicle windshield 16. The cover element, camera module 14 and bracket or brackets comprise a windshield electronics module that houses the camera module and that may also house one or more other electronic accessories (e.g., a rain sensor and/or the like) at the in-cabin side of the vehicle windshield 16.

The fan or blower motor may comprise a variable speed fan motor that is controlled, e.g., by the control or controller or electronic control unit (ECU) or processor or the like, with a PWM line. The controller includes control circuitry and associated software. The PWM duty cycle may be software (SW) controlled, based on one or more inputs, such as, for example, an input based on an output of a vehicle ambient temperature sensor (that provides a temperature at or near or indicative of the temperature at the camera module), an input based on an output of a vehicle ambient light sensor (to detect sunload and thus to provide an output that is indicative of temperature at the windshield and camera module), and an input based on an output of one or more internal temperature sensors at more critical components.

Optionally, other cooling elements or devices may also or otherwise be implemented to cool the camera module 14 during operation. For example, a Peltier element may be disposed at some components to increase thermal dissipation. Optionally, the camera module 14 may include integrated liquid cooling to enhance heat dissipation away from the camera module 14. Optionally, a channel or duct may guide and direct airflow from the separate cooling fan assembly to the camera module.

Optionally, the ECU of the system 10 and/or of the system 100 may comprise one or more heat dissipating features for reducing the temperature during operation at the ECU. For example, and as discussed below, the ECU may include a housing having heat dissipating fins disposed at the outer surface of the housing and in thermally conductive connectivity with heat generating electrical components housed within the housing of the ECU. Airflow across and between the heat dissipating fins may enhance heat dissipation.

Advanced driver assistance systems (ADAS) or vision systems include a significantly increasing number of features and functions to both provide additional functionality to consumers and also to meet governmental standards and regulations. Additionally, a trend has been observed in the automotive industry to provide a common or singular or central ECU to process data from various sensors in the vehicle (e.g. exterior viewing camera modules, radar sensors, driver/cabin monitoring cameras, surround view system cameras, cameras for camera monitoring systems (CMS), etc.) to provide the additional functionality. An increased number of features and functions results in a higher demand for processing speed and increased power consumption by ECUs and ADAS modules.

Generally, an ECU with increased processing and higher power consumption will result in higher heat generation. For example, heat is generated during operation of an ECU (e.g., an ECU for an ADAS system), such that, without enhanced cooling, maximum operating temperatures at the ECU and/or associated electronics may be exceeded because, for instance, the imager semiconductor junction temperature has to be below a threshold temperature to ensure necessary processing capabilities. The system includes an ECU module for improved, quicker, and more efficient heat dissipation to account for the greater heat generation resulting from the increased processing and power consumption of ADAS systems and the like. The ECU may be formed primarily from cost-efficient and light-weight materials such as electrically conductive or thermally conductive plastic or other composite materials.

Figure 9:
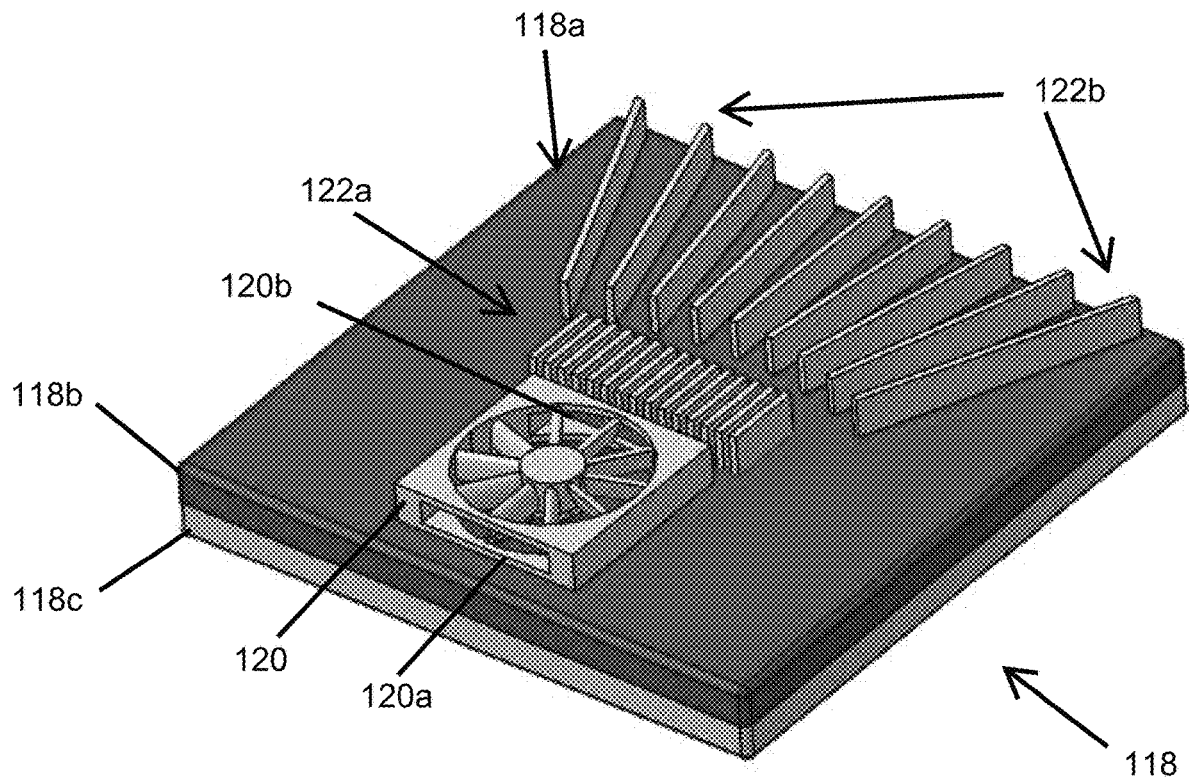
FIG. 9 is a perspective view of an ECU with heat dissipating fins at an outer surface of the housing of the ECU.

Referring now to FIG. 9, an ECU housing 118 is depicted with a cooling fan assembly 120 and heat dissipating fins 122 disposed at and/or in and/or on an outer surface 118*a* of the housing 118. As will be discussed further below, a circuit board 124 and thermal interface material 126 (such as a thermally conductive paste or grease or pad or the like) are disposed within an interior of the housing 118 and heat is generated within the interior of the housing 118 during operation of the ECU. The heat dissipating fins 122 are disposed in or extend through the material of the housing 118 so that a first portion or end of the fins 122 pass through the housing 118 and contact the thermal interface material 126 and a second portion or end of the fins 122 opposite the first end extend away from the outer surface 118*a* of the housing 118. The cooling fan 120 is disposed at the outer surface 118*a* of the housing 118 and configured to, when electrically operated, to create an airflow (FIG. 10) across or along the outer surface 118*a* of the housing 118 and between the heat dissipating fins 122. In the illustrated embodiment, the housing 118 has both a top element or portion 118b and a bottom element or portion 118c that may be seam welded together along an outer circumference or edge of the housing 118 such as to provide a waterproof or water resistant construction that is impervious to water intrusion into the housing 118. The housing 118 may comprise any suitable size and/or shape for the electronics contained inside and/or application or placement with its intended system. The housing 118 may comprise electrically conductive plastic or thermally conductive plastic or any other suitable material or composite material.

When the ECU is electrically operated, such as to process image data captured by a camera of the vision system or driving assistance system, the electric circuitry within the interior of the housing 118 generates heat. Heat generated at the interior of the housing 118 may be dissipated exterior the housing 118 via the heat dissipating fins 122. Airflow across the heat dissipating fins 122 helps rapidly cool and further remove heat from the circuit board 124 housed within the ECU housing 118. The airflow may be generated by any suitable external air source such as the cooling fan 120 or from a cooling fan assembly attached at the outer side of the housing. Although the illustrated embodiment includes an ECU with the cooling fan assembly 120 disposed at the outer surface 118a of the housing 118 for forced heat convection away from the ECU, it should be understood that a fan or airflow source may be disposed remote from the housing. For example, multiple ECU modules may share a universal cooling fan or airflow source to reduce the power consumption needed to cool multiple ECUs. Conversely, multiple cooling fans may be disposed at or near or on a single ECU housing to provide increased airflow and increased cooling power. Optionally, the active airflow may be generated by an external airflow source remote from the camera module 14 and directed toward the camera module 14 and ECU housing 118, such as the HVAC system of the vehicle, as discussed above.

The airflow source may be operated continuously during operation of the ECU. Optionally, the airflow source may be operated based on a condition. For example, a temperature sensor may be disposed at or near the ECU to determine a temperature of the ECU and the airflow source may be operated when the temperature at the ECU is above a threshold temperature. Optionally, a temperature sensor may be disposed at a location of the vehicle remote from the ECU, such as an ambient temperature sensor configured to sense an ambient temperature exterior or interior the vehicle, and the airflow source may be operated when the ambient temperature is above a threshold ambient temperature. The airflow source may be operated responsive to determinations of other conditions, such as responsive to an indication from an ambient light sensor or responsive to the ECU performing a given function that requires higher than normal processing power of the ECU. Optionally, the airflow source may vary the airflow provided to the ECU (i.e., provide stronger or weaker airflow) based on the condition, such as increasing the airflow when the temperature at the ECU is greater and reducing or ceasing airflow when the temperature at the ECU is lower.

In the illustrated embodiment, the cooling fan assembly 120 includes an air intake opening 120a through which air is drawn when the motor of the cooling fan assembly 120 is electrically powered, and directs airflow through an air discharge or outlet opening 120b and between and along heat dissipating fins 122 at the housing 118 that are at or near or thermally conductively connected to the circuit board 124. The cooling fan assembly 120 may comprise a low profile cooling fan assembly that does not protrude beyond the height of the heat dissipating fins 122 at the outer side 118a of the housing. The cooling fan assembly 120 may comprise a self-contained unit or module that includes the motor, fan blades and housing and exit openings, whereby the cooling fan assembly 120 is mounted at the housing 118 as a unit. The size and shape of the cooling fan assembly 120 may be selected based at least in part on the size and shape of the ECU housing 118 and the location and configuration of the heat dissipating fins 122.

The cooling fan assembly 120 may utilize aspects of the fan assemblies described in International Publication No. WO 2020/159914 and/or in U.S. Publication No. US-2021-0306538, which are hereby incorporated herein by reference in their entireties. For example, the fan assembly 120 may comprise a low profile fan assembly having a thickness that may be less than 12 mm, or may be less than 7.5 mm, or may be less than 5 mm. The air flow generated or output by the fan assembly 120 may be at a flow rate of at least 0.7 cubic feet per minute (CFM). The cooling fan assembly 120 may comprise a DC brushless motor with a 5V operating voltage, and may be pulse-width modulation (PWM) controlled. The cooling fan assembly 120 may have a starting voltage of around 4 VDC and may have an operating current of 183 mA and a rated power consumption of 0.92 Watts. The cooling fan assembly 120, when the motor is electrically powered, may generate up to around 1.18 CFM airflow (or more) when operating in the range of around 6,300 RPM to around 11,700 RPM (9000 RPM+/−30 percent). The operating temperature range may be around 0 degrees C. to around 85 degrees C., with a storage temperature range of around −40 degrees C. to around 90 degrees C. In a situation where the fan is locked by an external force while being electrically powered, an increase in coil temperature of the motor is prevented by temporarily turning off the electrical power to the fan motor. The fan may automatically restart when the locked rotor condition is released.

The cooling fan motor may comprise a variable speed fan motor that is controlled, e.g., by the control or controller or electronic control unit (ECU) or processor or the like, with a PWM line. The controller includes control circuitry and associated software. The PWM duty cycle may be software (SW) controlled, based on one or more inputs, such as, for example, an input based on an output of a vehicle ambient temperature sensor (that provides a temperature at or near or indicative of the temperature at the ECU), an input based on an output of a vehicle ambient light sensor (to detect sunload and thus to provide an output that is indicative of temperature at the windshield and ECU), and an input based on an output of one or more internal temperature sensors at more critical components. The fan may operate only with the necessary load and speed, in order to improve lifetime requirements based on targeted device under test (DUT) thermal mission profile. Thus, the design and configuration of the cooling fan assembly 120 can be adapted to provide desired flow rates at and along and between the respective heat dissipating fins 122.

Figure 10:
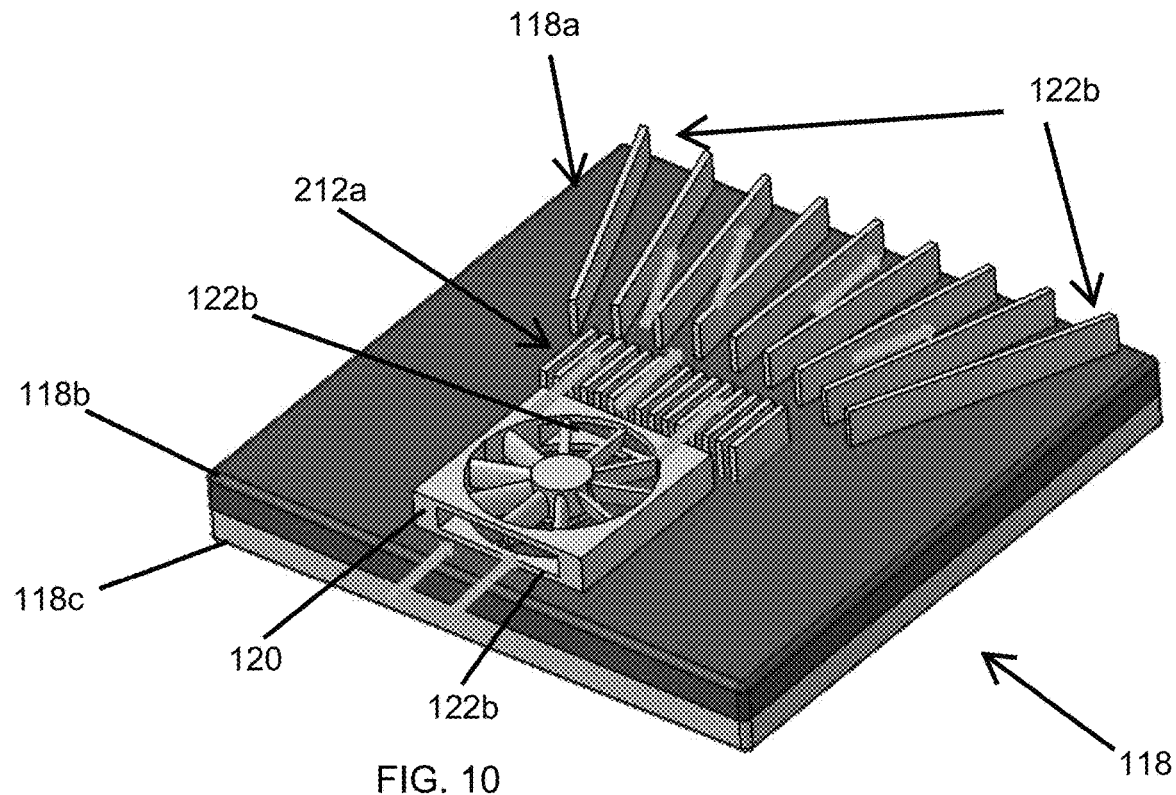
FIG. 10 is a perspective view of the ECU module of FIG. 9 with exemplary air flow across a surface of the ECU.
Figure 11:
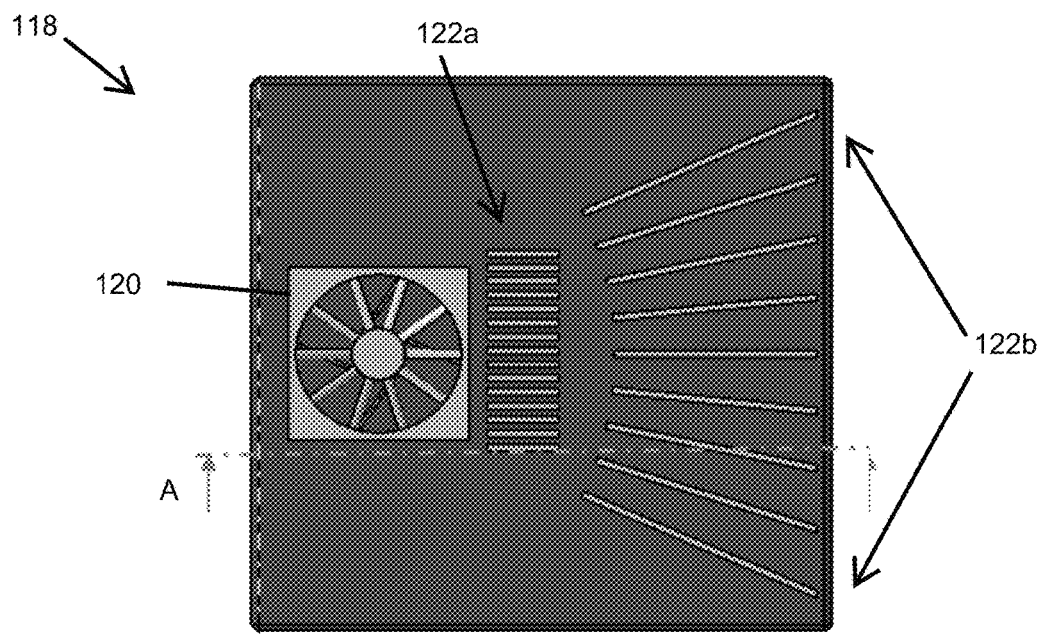
FIG. 11 is a top plan view of the ECU of FIG. 9.

As shown in FIGS. 9 and 10, the opening of the cooling fan assembly 120 provides the airflow an entrance to the heat dissipating fins 122, such that the air that is radially exiting the fan at the outlet opening 120b flows into and along and between the heat dissipating fins 122, which may comprise an suitable configuration. For example, the heat dissipating fins may comprise a first grouping of heat dissipating fins 122a in an arrangement at a first region of the housing 118 (such as adjacent the outlet opening 120b), and a second grouping of heat dissipating fins 122b in an arrangement at a second region of the housing 118 (such as distanced from the outlet opening 120b). In the illustrated embodiment, the first grouping of heat dissipating fins 122a are generally the same length, parallel to one another (as shown in FIG. 11), and terminate a distance away from a second grouping of heat dissipating fins 122b which are individually longer than the fins of the first grouping, angled relative to one another and the first grouping, and are arranged in an arc relative to the first grouping. The first grouping of fins 122a are also closer together than the second grouping of fins 122b. However, the fins may be different lengths, shapes, and orientations depending on the needs of the given system.

The cooling fan assembly 120 directs air through the outlet opening 120b in a direction generally parallel to the first grouping of heat dissipating fins 122a, such that the air moves along channels between adjacent fins to enhance cooling of the fins and thus of the ECU. The air moves along the channels between the first grouping of heat dissipating fins 122a toward and through and among the second grouping of fins 122b. Thus, the cooling fan 120 provides enhanced cooling of the heat dissipating fins 122 of the ECU module to enhance the dissipation of heat generated by the electrical components of the circuit board 124 during operation of the system 10.

Figure 12:
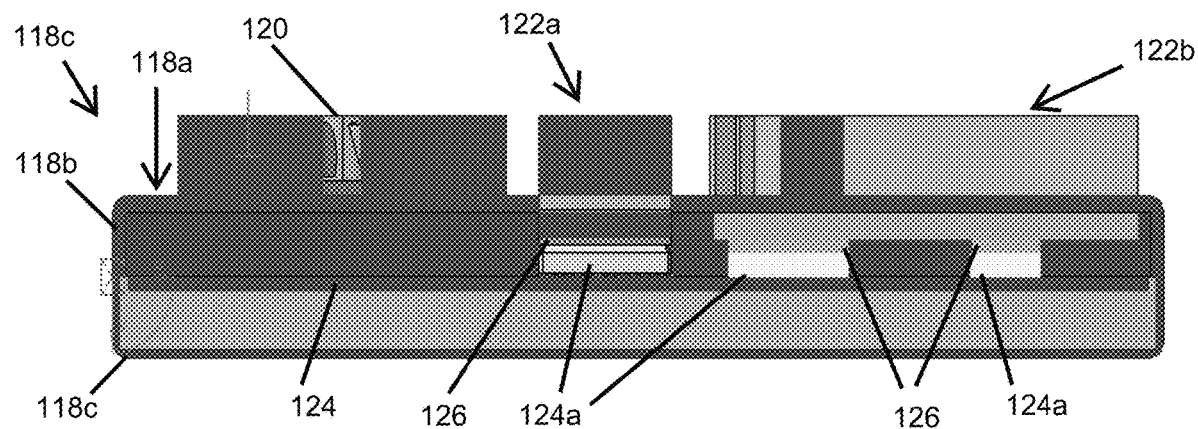
FIG. 12 is a cross-sectional view of the ECU along line A of FIG. 11.

Referring now to FIG. 12, the printed circuit board 124 (PCB) is disposed at an interior surface of the housing 118 and includes at least one electronic component 124a, such as a plurality of electronic components 124a. The circuit board 124 includes a first side and a second side opposite the first side and separated by a thickness of the circuit board. The electronic components 124a are disposed on the first side of the circuit board 124 facing the heat dissipating fins 122. The electronic components 124a may include processors (configured to process image or sensor data), integrated circuits (ICs), resistors, or other electronic components or circuitry that generate heat when the ECU is operated. For example, the circuit board may comprise an image processor that processes image data captured by a camera of an ADAS.

When the one or more electronic components 124a generate heat at the interior of the housing 118, the heat is dissipated exterior the housing 118 via the heat dissipating fins 122. The electronic components 124a are in thermally conductive connection with the heat dissipating fins 122, such as via direct engagement of the components 124a to the fins 122, via engagement of the components 124a at the surface of the housing 118, or via the thermal interface material 126 disposed between the components 124a and the fins 122. Optionally, the circuit board 124 may comprise electronic components on the first side of the circuit board facing the upper portion 118b of the housing and electronic components on the second side of the circuit board facing the lower portion 118c of the housing with heat dissipating fins disposed at the upper portion 118b and the lower portion 118c of the housing for dissipating heat exterior the ECU housing.

As shown in FIG. 12, the thermal interface material 126 thermally connects the electronic components 124a with the heat dissipating fins 122 disposed at the outer surface of the housing. The thermal interface material 126 may comprise a thermal paste, thermal pad, thermal grease, or any other suitable thermally conductive material. As the electronic components give off heat during operation, the heat travels (via thermal conduction) through the thermal interface material 126 to the heat dissipating fins 122. The thermal interface material 126 may be positioned or targeted or concentrated at and/or around components 124a of the circuit board that generate heat so as to further facilitate and improve heat dissipation. Thus, the thermal element 126 or paste or grease may interface or thermally conductively connect the circuit board 124 (and/or an electrical components 124a at the circuit board) with the inner or upper surface of the housing 118 and thus with the heat dissipating fins 122a, 122b at the exterior or outer surface 118a of the housing to enhance heat transfer from the ECU. Furthermore, the thermal element may comprise a plurality of thermal elements 126 thermally conductively connecting components 124a to the fins 122a, 122b to enhance cooling of the separate components 124a at the circuit board 124.

Thus, the circuit board 124 is in thermally conductive connection with the heat dissipating fins 122 via the thermal interface material 126 and/or a wall thickness of the housing 118 at the location where the thermal material 126 is disposed (if the heat dissipating fin is not in direct contact with the thermal interface material at that location). Thus, heat may be released by the electronic components 124a and expelled more quickly and easily via a surface spaced away from the circuit board 124, thereby reducing the heat at the circuit board 124.

The heat dissipating fins 122 may be overmolded with and pass through the wall of the housing 118 so that a base or first end or portion of the fins is disposed in or under the housing 118 and a second end or portion extends above or away from the outer surface 118a of the housing. In the illustrated embodiment, the fins substantially resemble a T-shape where the header of the T-shape lies within or under or is overmolded by the housing material and the leg of the T-shape extends away from the housing so as to be exposed for heat dissipation via airflow. The material of the fins 122 may be selected to be highly thermally conductive, while the material of the housing 118 may be selected for its strength and sealing capabilities, so that the construction of the fins 122 extending through the housing wall provides enhanced heat dissipation while not compromising the strength and durability of the housing 118.

The fins are in thermally conductive contact with the circuit board 124 contained within the housing 118. For example, the fins may be in direct contact with the thermal interface material 126 disposed at the circuit board 124. For optimum heat dissipation, the location of the fins may align with locations of the electronic components 124a at the circuit board 124 and especially at locations corresponding to electronic components 124a that generate the most heat. For example, the location of the heat dissipating fins 122 may align with locations of several processors or ICs disposed at the circuit board such that the heat dissipating fins are located and in contact with the thermal interface material at the processors or ICs generating heat. Optionally, the layout of electronic components 124a at the circuit board 124 may be configured to match a pattern of the heat dissipating fins 122, or otherwise be configured and spaced apart to maximize heat dissipation from the housing 118.

Thus, the ECU, in conjunction with a vehicle vision system or ADAS at a vehicle, may perform a variety of functions, include various processors, ICs, and other electronic components, and may communicate with various optional systems of the vehicle. The ECU comprises the housing, the circuit board disposed within the housing, heat dissipating fins disposed at least at an outer surface of the housing and in thermal conductive connection with the circuit board. The thermal conductive material is in connection with both the circuit board and the heat dissipating fins. The airflow source provides airflow in the direction of the heat dissipating fins to aid in the dissipation of heat away from the ECU. Thus, the ECU comprises enhanced cooling abilities.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 10,442,360 and/or 10,046,706, and/or U.S. Publication Nos. US-2021-0245662; US-2021-0162926; US-2021-0155167 and/or US-2019-0118717, and/or International PCT Application Ser. No. PCT/US22/70062, filed Jan. 6, 2022, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The ECU and/or camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796, 094; 6,097,023; 6,320,176; 6,559,435; 6,831,261; 7,004, 606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forward, sideward or rearward directed vehicle vision system utilizing principles disclosed in U.S. Pat. Nos. 5,550, 677; 5,670,935; 5,760,962; 5,877,897; 5,949,331; 6,222, 447; 6,302,545; 6,396,397; 6,498,620; 6,523,964; 6,611, 202; 6,201,642; 6,690,268; 6,717,610; 6,757,109; 6,802, 617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268; 7,370,983; 7,937,667 and/or 9,800,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

The system may utilize sensors, such as radar or lidar sensors or the like, to detect presence of and/or range to other vehicles and objects at the intersection. The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties. The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in U.S. Pat. Nos. 10,071,687; 9,900,522; 9,834,153; 9,762,880; 9,596,387; 9,264,672; 9,126,525 and/or 9,041,806, and/or U.S. Publication No. US-2015-0022664, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
a camera module configured for mounting at an in-cabin side of a windshield of a vehicle equipped with the vehicular vision system;
wherein the camera module comprises an imager assembly and a processor circuit board having circuitry disposed thereat, and wherein the circuitry includes an image processor;
wherein the imager assembly comprises an imager circuit board, and wherein an imager is disposed at the imager circuit board, and wherein the circuitry disposed at the processor circuit board is electrically connected to the imager disposed at the imager circuit board;
wherein the imager assembly, with the camera module mounted at the in-cabin side of the windshield of the vehicle, views through the windshield and forward of the vehicle, and wherein the imager assembly captures image data, and wherein the image processor processes image data captured by the imager assembly;
wherein the camera module comprises a windshield-interfacing portion that, with the camera module mounted at the in-cabin side of the windshield, interfaces with the in-cabin side of the windshield;
a thermally conductive tape disposed at the windshield-interfacing portion of the camera module;
a thermally conductive connecting element that thermally conductively connects to (i) the thermally conductive tape disposed at the windshield-interfacing portion and (ii) at least one electrically operated component of the camera module that generates heat when electrically operated;
wherein the at least one electrically operated component comprises the image processor; and
wherein, when the at least one electrically operated component is electrically operated, heat generated by the at least one electrically operated component of the camera module is dissipated at the windshield of the vehicle via the thermally conductive connecting element and the thermally conductive tape.

2. The vehicular vision system of claim 1, wherein the camera module comprises a light shield disposed at the windshield and forward of the imager assembly, and wherein the windshield-interfacing portion of the camera module comprises a peripheral lip of the light shield.

3. The vehicular vision system of claim 1, wherein the at least one electrically operated component is in thermal conductive connection with the thermally conductive connecting element via a thermal element at an inner side of a camera housing of the camera module.

4. The vehicular vision system of claim 1, wherein the thermally conductive connecting element connects to an outer side of the camera module at a location that is opposite from the location of the at least one electrically operated component at an inner side of the camera module.

5. The vehicular vision system of claim 1, wherein the thermally conductive connecting element passes through a camera housing of the camera module to directly thermally conductively connect to the at least one electrically operated component.

6. The vehicular vision system of claim 1, wherein the at least one electrically operated component is disposed at the processor circuit board.

7. The vehicular vision system of claim 1, wherein the thermally conductive connecting element thermally conductively connects to a plurality of electrically operated components of the camera module that generate heat when electrically operated.

8. The vehicular vision system of claim 1, wherein the thermally conductive tape and the thermally conductive connecting element comprise graphite strips.

9. The vehicular vision system of claim 1, wherein the at least one electrically operated component of the camera module comprises a plurality of electrically operated components that generate heat when electrically operated, and wherein the thermally conductive connecting element comprises a ribbon that thermally conductively connects to (i) the thermally conductive tape disposed at the windshield-interfacing portion and (ii) each component of the plurality of electrically operated components.

10. The vehicular vision system of claim 1, wherein the at least one electrically operated component of the camera module comprises a plurality of electrically operated components that generate heat when electrically operated, and wherein the thermally conductive connecting element comprises a plurality of ribbons, each ribbon of the plurality of ribbons thermally conductively connecting to (i) the thermally conductive tape disposed at the windshield-interfacing portion and (ii) a respective component of the plurality of electrically operated components.

11. The vehicular vision system of claim 1, wherein the thermally conductive tape is adhesively attached at the windshield-interfacing portion.

12. The vehicular vision system of claim 11, wherein the thermally conductive tape adhesively attaches at the in-cabin side of the windshield when the camera module is mounted at the in-cabin side of the windshield.

13. The vehicular vision system of claim 1, wherein the thermally conductive tape extends along a portion of the in-cabin side of the windshield, and wherein the thermally conductive tape adhesively attaches along the portion of the in-cabin side of the windshield.

14. The vehicular vision system of claim 13, wherein the portion of the in-cabin side of the windshield comprises an upper perimeter edge region of the windshield.

15. The vehicular vision system of claim 1, comprising an airflow source configured to provide airflow at a portion of the camera module, wherein the airflow source is operable to direct airflow along the portion of the camera module to improve heat dissipation from the camera module.

16. The vehicular vision system of claim 15, wherein the airflow source comprises a vent at an interior portion of the vehicle, the vent including flow directing elements that direct airflow through the vent and toward the camera module, and wherein the vehicular vision system controls a heating, ventilation and air conditioning (HVAC) system of the vehicle to discharge air through the vent, the vent directing airflow toward the camera module.

17. The vehicular vision system of claim 16, comprising a temperature sensor for sensing a temperature at the camera module and generating an output indicative of the sensed temperature, wherein the vehicular vision system controls the HVAC system to discharge air through the vent responsive to the output of the temperature sensor being indicative of the camera module operating outside of a set operating temperature range.

18. A vehicular vision system, the vehicular vision system comprising:
 a camera module configured for mounting at an in-cabin side of a windshield of a vehicle equipped with the vehicular vision system;
 wherein the camera module comprises an imager assembly and a processor circuit board having circuitry disposed thereat, and wherein the circuitry includes an image processor;
 wherein the imager assembly comprises an imager circuit board, and wherein an imager is disposed at the imager circuit board, and wherein the circuitry disposed at the processor circuit board is electrically connected to the imager disposed at the imager circuit board;
 wherein the imager assembly, with the camera module mounted at the in-cabin side of the windshield of the vehicle, views through the windshield and forward of the vehicle, and wherein the imager assembly captures image data, and wherein the image processor processes image data captured by the imager assembly;
 wherein the camera module comprises a windshield-interfacing portion that, with the camera module mounted at the in-cabin side of the windshield, interfaces with the in-cabin side of the windshield;
 a thermally conductive tape disposed at the windshield-interfacing portion of the camera module, wherein the thermally conductive tape is adhesively attached at the windshield-interfacing portion;
 wherein the thermally conductive tape adhesively attaches at the in-cabin side of the windshield when the camera module is mounted at the in-cabin side of the windshield;
 a thermally conductive connecting element that thermally conductively connects to (i) the thermally conductive tape disposed at the windshield-interfacing portion and (ii) at least one electrically operated component of the camera module that generates heat when electrically operated;
 wherein the thermally conductive tape and the thermally conductive connecting element comprise graphite strips;
 wherein the at least one electrically operated component comprises the image processor; and
 wherein, when the at least one electrically operated component is electrically operated, heat generated by the at least one electrically operated component of the camera module is dissipated at the windshield of the vehicle via the thermally conductive connecting element and the thermally conductive tape.

19. The vehicular vision system of claim 18, wherein the camera module comprises a light shield disposed at the windshield and forward of the imager assembly, and wherein the windshield-interfacing portion of the camera module comprises a peripheral lip of the light shield.

20. The vehicular vision system of claim 18, wherein the at least one electrically operated component is in thermal conductive connection with the thermally conductive connecting element via a thermal element at an inner side of a camera housing of the camera module.

21. The vehicular vision system of claim 18, wherein the thermally conductive connecting element connects to an outer side of the camera module at a location that is opposite from the location of the at least one electrically operated component at an inner side of the camera module.

22. The vehicular vision system of claim 18, wherein the thermally conductive connecting element passes through a camera housing of the camera module to directly thermally conductively connect to the at least one electrically operated component.

23. A vehicular vision system, the vehicular vision system comprising:
- a camera module configured for mounting at an in-cabin side of a windshield of a vehicle equipped with the vehicular vision system;
- wherein the camera module comprises an imager assembly and a processor circuit board having circuitry disposed thereat, and wherein the circuitry includes an image processor;
- wherein the imager assembly comprises an imager circuit board, and wherein an imager is disposed at the imager circuit board, and wherein the circuitry disposed at the processor circuit board is electrically connected to the imager disposed at the imager circuit board;
- wherein the imager assembly, with the camera module mounted at the in-cabin side of the windshield of the vehicle, views through the windshield and forward of the vehicle, and wherein the imager assembly captures image data, and wherein the image processor processes image data captured by the imager assembly;
- wherein the camera module comprises a windshield-interfacing portion that, with the camera module mounted at the in-cabin side of the windshield, interfaces with the in-cabin side of the windshield;
- a thermally conductive tape disposed at the windshield-interfacing portion of the camera module;
- a thermally conductive connecting element that thermally conductively connects to (i) the thermally conductive tape disposed at the windshield-interfacing portion and (ii) at least one electrically operated component of the camera module that generates heat when electrically operated;
- wherein the thermally conductive connecting element passes through a camera housing of the camera module to directly thermally conductively connect to the at least one electrically operated component;
- wherein the at least one electrically operated component comprises the image processor; and
- wherein, when the at least one electrically operated component is electrically operated, heat generated by the at least one electrically operated component of the camera module is dissipated at the windshield of the vehicle via the thermally conductive connecting element and the thermally conductive tape.

24. The vehicular vision system of claim 23, wherein the camera module comprises a light shield disposed at the windshield and forward of the imager assembly, and wherein the windshield-interfacing portion of the camera module comprises a peripheral lip of the light shield.

25. The vehicular vision system of claim 23, wherein the thermally conductive tape and the thermally conductive connecting element comprise graphite strips.

* * * * *